United States Patent Office 3,526,520
Patented Sept. 1, 1970

3,526,520
CONTROL OF APPLE STORAGE SCALD USING CERTAIN DIPHENYLAMINE COMPOSITIONS
Morton Kleiman, 2827 W. Catalpa Ave., Chicago, Ill. 60625
No Drawing. Filed July 12, 1967, Ser. No. 652,716
Int. Cl. A23b 7/14
U.S. Cl. 99—154                                    10 Claims

ABSTRACT OF THE DISCLOSURE

Treating and controlling apple storage scald with compositions comprising diphenylamine, emulsifier, and an organic solvent in such proportions as to provide concentrate solutions having a specific gravity greater than 1.0.

This invention relates to improved compositions of matter which are uniquely valuable for the treatment of apples that are to be held in cold storage, and to a method of applying said compositions. More specifically, the improved compositions of my invention are of great utility for application to apples prior to or shortly after placement thereof in cold storage, in order to prevent the development of storage scald on the fruit.

Storage scald is a physiological disorder which affects apples after they have been in cold storage for some variable length of time. The cause of this disfunction remains unknown although it has been studied extensively for over forty years. Moreover, the occurrence of this physiological spoilage is not predictable, so that great economic losses can be sustained in some seasons unless the apples can be successfully treated to prevent its development. The most effective means of treating apples for storage scald prevention is the application thereto of the chemical diphenylamine. Heretofore, the latter has been applied to apples in a finely particulate state of subdivision in water suspension, such suspensions being prepared by dispersing the finely milled chemical in water in the substantial absence of any auxiliary solvent. In one embodiment of this method, diphenylamine is finely milled with various diluents and adjuvants, and such mixture is added to the appropriate volume of water with agitation.

Although the use of such dispersions of diphenylamine in water for apple scald prevention is attended with excellent results, it is frequently desirable to be able to handle the active chemical in the form of a concentrated liquid solution rather than as a powdered product. Personnel who handle materials in fruit storage plants may be subject to sensitivity to the dust which gets into the air when measuring or weighing a powder, and managers of such operations are concerned that too much active material is frequently lost in the handling of a dry, powdered product because of the dusting tendencies. Thus, there has been a need for a liquid form of diphenylamine-containing product suitable for dilution with water to make dispersions and emulsions which can be used for fruit treatment for storage scald prevention.

In my co-pending applications, Ser. Nos. 652,700 and 652,711, I have disclosed classes of diphenylamine-containing liquid compositions which are eminently suitable for treatment of apples for storage scald prevention. I have now further discovered that the solvent systems disclosed therein, as well as other solvent systems, may be even more advantageously utilized for the preparation of uniquely desirable and superior diphenylamine-containing compositions if said compositions are improved by controlling the concentrations of the several components so as to adjust certain physical properties as more fully disclosed hereinafter.

One of the characteristic and not entirely avoidable features inherent in the use of emulsifiable concentrate solutions of diphenylamine in the form of aqueous dispersions or emulsions is the tendency of the latter to separate into two phases after standing for some period of time. This tendency is common to all emulsions, and the separation of one phase which is richer in a particular component than the other phase is commonly referred to as "creaming." When this occurs, one phase rises to the top of the liquid mixture and floats on top of the other phase. This creates certain problems in the practical use of such diphenylamine-containing liquid concentrates in the form of aqueous emulsions and dispersions for scald-preventive treatment of apples. The cream, which rises and floats on the surface of the bath when agitation of the emulsion is not constantly provided or is temporarily interrupted, is richer in diphenylamine than is the balance of the mixture. As a result, when the emulsion is used for treating apples by dipping them therein, the fruit is subjected to contact with a significantly higher concentration of the active ingredient than would normally be used. This may at times result in injury to the fruit and also in too high a residual quantity of the chemical remaining on the fruit surfaces. When apples are removed after immersion in such a treating bath, they are coated again with the concentrated cream which is floating at the surface and which tends to adhere to and to deposit upon anything which is dipped into the bath and then removed therefrom. Additionally, this results not only in heavy but also in uneven deposits of the scald-inhibitory residues on the surfaces of the treated fruits. Thus, it becomes apparent that it is highly undesirable for the fruit treatment bath to form a diphenylamine-rich cream which floats on its surface.

It is an object of the present invention to provide diphenylamine-containing compositions which produce improved emulsions and dispersions in water when mixed therewith, which emulsions and dispersions are more suitable and effective for scald-preventive treatment of apples than those hitherto available. It is a further object of this invention to produce improved diphenylamine-containing compositions capable of producing improved, aqueous emulsions in water, which emulsions will promote thorough and even wetting of the apple surface, and which will spread the internal, dispersed phase evenly thereon to form improved, substantially invisible, diphenylamine-containing coating having scald-preventive properties. It is a still further object of my invention to provide improved, diphenylamine-containing compositions, which, upon dispersion or emulsification in water for preparation of scald-inhibitory fruit treatment baths, form substantially no diphenylamine-enriched cream which floats on the surface of the mixture. These and other objects and advantages of my invention will become apparent to those skilled in the art from the following description thereof.

I have discovered that by adjusting the specific gravity of the diphenylamine-containing, emulsifiable and dispersible compositions so that it is greater than 1.000 as more particularly defined hereinafter, it is possible to exercise control over the creaming effect so that when such concentrate solutions are dispersed or emulsified in water and then allowed to stand without further agitation for a time, the diphenylamine-rich phase which separates as the emulsion or dispersion stands will settle downward rather than tending to float on the top of the mixture. This can be accomplished by balancing the relative concentrations of each of the several components of the organic solution, and by selecting solvents and surfactants which, conjointly with diphenylamine at the desired concentration, provide a concentrate solution having a specific gravity of greater than 1.000, as required in the practice of my invention.

The exact value of the final specific gravity of the diphenylamine concentrate solution is not critical provided that it is greater than 1.000 either before or after its dispersion or emulsification in water, as more fully explained below. In general, I prefer to adjust the specific gravity so that it falls within the range of about 1.001 to about 1.250, and prefer especially the range of about 1.01 to about 1.06. However, the specific gravity may be higher than these values, there being no particular critical upper limit on the specific gravity of the concentrate. The original value of the specific gravity of the diphenylamine-containing concentrate solution determines its physical behavior upon addition to water in that the concentrate tends to float on or to sink beneath the surface of water when it is first added thereto, according to whether the specific gravity of the organic phase is less than 1.000 or greater than 1.000. Upon dispersion or emulsification in water, the organic, diphenylamine-containing concentrate solution becomes the internal, dispersed phase, and the particles of the latter tend to continue to possesss the original physical properties of said concentrate, notwithstanding the fact that some of the original components of the concentrate solution which have some water solubility are leached out during the dispersion process. Generally, the extent of modification of the specific gravity which results from this leaching out of water-soluble component into the aqueous, external phase of the dispersion is minor, although the individual dispersed particles may become slightly more or less dense as a result. It is thus possible to start with a diphenylamine concentrate solution whose specific gravity is just slightly greater than that of water, practically at the borderline of equality, and to end up with a dispersed phase the particles of which are somewhat more dense than water, so that they tend to settle downward rather than to cream to the top of such dispersions and emulsions. Such changes are a part of the spirit and concept of the invention, that is to say, the specific gravity which is being defined encompasses both the original diphenylamine-containing, concentrate solution and the particles thereof when the latter become the internal, dispersed phase in aqueous medium. In actual practice of the invention, it is only necessary that the specific gravity of the ultimate particles be greater than 1.000 in order for the benefits of the invention to be realized.

It will be at once evident to one skilled in the art that the determinative criterion of the specific gravity properties as defined in the present invention is the actual behaviour of the diphenylamine concentrate solution upon its addition to water: if the former penetrates below the surface of the latter and remains submerged therein without floating to the top, and/or if the particles of the dispersion of said organic concentrate solution remain beneath the surface of the aqueous, external phase after dispersion or emulsification and form substantially no cream which floats or rises to the surface, the particles settling downward rather than rising, the solution meets the requirements of the invention. It is also immediately apparent that the application of this test is quite simple and direct, so that it becomes unnecessary in actual practice to determine by actual measurement the exact value of the specific gravity.

One of the distinct and noteworthy advantages inherent in the compositions of the present invention is the ability and the proclivity of the dilute, aqueous emulsions prepared therefrom to spread the internal, disperse phase over the surface of the fruit being treated and to deposit thereon an improved, even, infinitesimal, substantially invisible, diphenylamine-containing film, which is both scald-preventive for fruit placed in cold storages, and which at the same time avoids disturbing or altering the normal appearance of the fruit surface. When applications of diphenylamine are made to apples from dilute, aqueous, substantially organic solvent-free dispersions prepared from finely milled diphenylamine compositions, there often remains on the surface of the fruit a visible deposit, powder-like in appearance and whitish or grayish-white in color, which residue is not always desirable in the eyes of consumers. By treating fruit with the improved, dilute, aqueous emulsions prepared from the improved compositions of the present invention rather than from finely milled diphenylamine compositions, the formation of such visible residues is avoided, and even, highly efficient, protective diphenylamine films are produced.

In the practice of my invention, diphenylamine is combined with one or more organic solvent materials, such as, for example, those disclosed in my co-pending applications, Ser. Nos. 652,700 and 652,711, or other suitable solvents, and with any of a wide selection of one or more emulsifying agents, a combination of two or more of the latter generally being more desirable, it only being necessary that the materials chosen be compatible at ordinary temperatures and be present in sufficient amounts to form a solution which can be emulsified or dispersed in water, and that the concentrations of the several materials used be so adjusted that the specific gravity of the diphenylamine concentrate solution, and more particularly of its water-dispersed particles, be over 1.000, as hereinbefore discussed. The number of solvent materials and of emulsifiers or surfactants which are selected to be combined to prepare a formulation within the scope of my invention is not critical, it being possible to use several such materials to good advantage in a large variety of possible combinations. Also, the order or manner of mixing, and the temperature of mixing are not important or critical, nor is it significant if in some instances relatively minor amounts of some insoluble material may separate to produce a turbidity or to give a precipitate in small proportion; minor amounts of such precipitate or turbidity can be readily removed in the ordinary manner by settling or decantation, or by filtration, and do not constitute incompatibility for the purposes of the practice of the invention.

In the preparation of the dilute, aqueous dispersions and emulsions from the compositions of the present invention, it is necessary only to provide a sufficient degree of mixing for a sufficient time to obtain the desired dispersion. Such mixing may be provided by turbulent flow in a section of pipe, or by addition of the concentrate to water at high velocity through an orifice, or by high-shear stirring, or by passing the mixture of concentrate solution and water through a colloid mill, or by mixing with a simple paddle mixer in a tank, or by any other convenient means suitable to the size and nature of the equipment and the characteristics of the concentrate solution. Upon cessation of the mixing or agitation, the compositions of the present invention provide for the preferential separation of the diphenylamine-rich, internal, dispersed phase to the bottom of the container or bath as the emulsion stands, so that substantially no diphenylamine-rich cream floats upon the surface of the vessel. As will be evident to those skilled in the art, it is possible to make compositions within the scope and spirit of the invention which are capable of emulsification and dispersion in water under conditions varying from very slight agitation of short duration to conditions of vigorous, high-shear, and continuous agitation. Likewise, such emulsions may be stable for relatively short periods of time before "creaming" or breaking, or for quite long periods of time, even without continuous mixing. The spirit and scope of my invention include all such compositions, such differences being only a matter of degree and not of intrinsic importance to the practice of the invention. The nature, duration and means of agitation are primarily a matter of convenience, the important feature of the invention being the avoidance of the formation of a lighter, floating cream layer upon cessation of agitation, so as to enable treated fruit to pick up an even, effective, readily applied, scald-inhibitory film of diphenylamine from the dilute emulsions of the nature hereinbefore disclosed.

The compositions of my invention are generally added to water with agitation and mixing so as to produce an emulsion or dispersion which contains a preferred concentration, by weight, of from about 0.1 to about 0.2% of diphenylamine. While these concentrations are not critical, it has been found that most varieties of apples can be beneficially treated for scald prevention within this range, although lower concentrations such as 0.05 and in some instances even 0.025% can be satisfactorily employed, and higher concentrations, e.g., 0.3, 0.4, and 0.5% may be used. Generally speaking, the fruit is treated by simply dipping it, in boxes or other containers, into the dilute emulsion, allowing the fruit to remain in contact with the liquid for a short time, the length of immersion time not being a critical factor, then removing the fruit and placing it in storage. Alternatively, the liquid emulsion or dispersion may be sprayed onto the fruit while the latter is still on the tree, or it may be sprayed onto the already harvested fruit as the latter is moved down a roller sorter or a conveyor. Various modes of application of the dilute emulsions prepared in accordance with my invention will be evident to operators skilled in the handling of fruit and in the operation of storage houses. It will suffice to note that the manner of application is not a critical factor, it only being necessary to make certain that all of the fruit is adequately wet with the liquid and that the fruit is drained sufficiently after treatment to avoid its standing in an accumulation of the treating liquid which has drained.

It is obvious that the final concentration of the aqueous emulsion used for treating fruit as described above can be achieved with an emulsifiable or dispersible solution of diphenylamine having almost any desired diphenylamine concentration, and that in choosing a concentration for the concentrate solution, one is limited only by practical considerations of convenience and of costs as regards the lower concentration limit, and by the diphenylamine solubility characteristics in the solvent-surfactant composition at the higher concentration limit. In addition, it is necessary to adjust concentrations of components so as to achieve the desired, and previously described specific gravity requirement, but this presents no particular difficulty, as varying the solvent-surfactant combinations along with the diphenylamine concentration allows for sufficient adjustment possibilities of the specific gravity of the final solution. In general, the greater the concentration of diphenylamine, the higher will be the specific gravity of the solution; also, the higher the specific gravity of the solvent or solvents, the higher will be the final specific gravity of the solution; and similarly, the higher the specific gravity of the surfactant or surfactant combination, the higher will be the resultant specific gravity of the final solution. Thus, the adjustment of any one or more of these variables with respect to the others allows considerable degrees of freedom in attaining the desired physical properties of the end product. In practice, the emulsifiable and dispersible concentrate solutions of the present invention may contain, by weight, as little as about 5% diphenylamine, or as high as about 65 or 70% diphenylamine, although the preferred and especially useful concentrations will generally fall within the range of from about 15 to about 50% diphenylamine. The range of useful concentration of solvent may extend from as low a value as 1% to as high as about 85%. It is desirable to avoid, however, using excessively large amounts of solvent so as to hold costs to economical limits. It is also necessary to take into consideration the concentration of the emulsifiers to be used and their specific gravities, so as to make a concentrate having the specific gravity properties desired.

The surfactants and emulsifiers which may be used in the practice of my invention can be any of quite a large number and variety of types, it being necessary only that the materials selected be mutually compatible as previously explained. Among the surfactants and emulsifiers which can be used in the practice of my invention, the following may be mentioned for purposes of illustration, but it should be understood that it is not intended to limit hereby the selection of such materials in the practice of my invention to the individual examples listed:

(1) Polyethoxylated alkylphenols, e.g., polyethoxylated octylphenol, polyethoxylated nonylphenol, polyethoxylated dodecylphenol, and other such materials, available commercially under the trade names "Triton X–," "Tergitol NP–," "Tergitol 12P," "Igepal CA," "Igepal CO," "Sterox," "Ninox," "Hyonic PE," and others; the number of moles of ethylene oxide per mole of alkylphenol being variable within wide limits, but commonly being of the order of from about 3 moles of ethylene oxide per mol of alkylphenol to about 30;

(2) Sulfated, polyethoxylated alkylphenols and their salts, available commercially under the trade names "Triton," "Alipal," "Cellopal," "Neutronyx S," Sulfotex," and others;

(3) Polyethoxylated amines and amides, available commercially under the trade names "Amidox C," "Amidox L," "Emulphor V," "Ethofat," "Priminox," and others; the number of moles of ethylene oxide per mol of amine or amide being variable within wide limits, but commonly being of the order of from about 3 to about 30 moles of ethylene oxide per mole of amine or amide;

(4) Long chain ($C_{12}$ and higher) fatty acid salts, e.g., oleic, palmitic, stearic, lauric acids, tall oil fatty acid salts of alkali metal and amines;

(5) Sorbitan esters of fatty acids, available commercially under the trade names "Armotan," "Emsorb," "Span," and many others;

(6) Polyethoxylated sorbitan esters of fatty acids, available commercially under the trade names of "Tween," "Armotan," "Emsorb," and many others; these last two particular classes of emulsifiers alone and in combination with each other constituting a common and frequently-used type of emulsifier, favored particularly for food product applications;

(7) Polyethoxylated fatty acids and polyethoxylated fatty esters, available under the trade names "Surfactol," "Nonisol," "Emerest," Emulphor EL," "Lipal" and others;

(8) Polyethoxylated long-chain alcohols, commercially available under various trade names, such as "Alkanol," "Brij," "Emulphor ON," "Emulphogene BC," "Lipal," "Tergitol 3," and others;

(9) Sulfated, polyethoxylated, long-chain alcohols and their salts, commercially available under the trade names "Avirol," "Duponol," "Empicol," "Maprofix," "Sipon," and others;

(10) Alkyl aryl sulfonates, such as octyl-, nonyl-, dodecyl-, and tridecylbenzene sulfonic acids and salts thereof, available commercially under the trade names "Ahcowet," "Conco AAS," "Eccoterge ASB," "Ecconol 606," "Emcol," "Nacconol," "Ninate," "Orvus," "Petro," "Santomerse," "Siponate," and many others;

(11) Mono- and di-glycerides of fatty acids, available commercially under the trade names "Drewmulse," "Emcol," "Kessco," "Surfactol," "Arlacel," "Myverol," "Starfol," and others;

(12) N-acylsarcosine derivatives and salts thereof, available commercially under the trade names "Rokosyl," "Sarkosyl," and others:

(13) Fatty acid alkylol amide condensates, commercially available under the trade names "Alrosol," "Emcol," "Empilan," "Hyconic," "Ninol," "Nopcogen," "Onyxol," "Permalene," and others;

(14) Organic phosphate ester derivatives, commercially available under the trade names "Alkapent," "Antara," "Crestol," "Phosphonol," "Tergitol," "Victamul" "Victawet," "QS Surfactants," and others; the number of moles of ethylene oxide per mole of compound in all of the above-listed polyethoxylated surfactants being variable within wide limits, but commonly being of the order of from about 3 to about 30 moles per mole.

The foregoing list of emulsifiers and surfactants is by no means complete or exhaustive, as there are indeed numerous such materials available to the art in addition to those named above, and the selection of a desired emulsifier or combination of emulsifiers allows considerable variations as to types, relative amounts of various components, and selected properties, such as foam characteristics, degree of water solubility, rate of dissolution in water or dispersion in water, wetting and spreading properties, effects on surface and interfacial tension, and others. It would not be practically feasible to name all of the materials which are available to the trade, many of which are duplicates under different trade names, as can be noted from the numerous examples cited above. Moreover, the numerous combinations possible within the scope of the present invention will be amply evident to one skilled in the art, it being possible to utilize these many various materials in conjunction with a variety of solvents, such as those disclosed in my copending applications, Ser. Nos. 652,700 and 652,711, or others, to prepare the novel and useful compositions herein disclosed.

Some examples of emulsifiable and dispersible concentrate solutions of diphenylamine which are typical embodiments of the invention, based upon the detailed, foregoing disclosure are presented below for purposes of more fully illustrating the practice of the invention. All percentages given are by weight.

EXAMPLE 1

A concentrate was prepared from 20 g. diphenylamine, 50 g. triethyl citrate, and 30 g. of a mixture of surfactants comprising 60% "Tergitol NP-35" and 40% "Tween 20."

Ten liters of dilute, aqueous emulsion containing 0.15% diphenylamine was prepared by dispersing 75 g. of said concentrate in water. Upon addition of the concentrate to water, it was noted that the concentrate was more dense than water and sank beneath the surface. After formation of the diphenylamine emulsion, it was also noted that if said emulsion was allowed to stand for a time without agitation or mixing, the dispersed, diphenylamine-rich phase tended to settle downward, rather than to rise to the surface, this indicating that its specific gravity was greater than 1.000.

Twenty-five freshly harvested Rome Beauty apples were treated with this emulsion by pouring it over them in a container having openings at the bottom for rapid drainage. The wet apples were placed immediately in cold storage at 0° to 1° C. and 90% relative humidity, along with a similar group of apples of the same variety treated in the identical manner with water only. The apples were held in the cold for a period of 120 days, after which they were removed and placed at room temperature of 20° to 23° C. for seven days. The two groups of apples were then rated for scald incidence, and the following observations were made:

|  | Percent scald | Percent scald control |
|---|---|---|
| Test apples | 12 | 85 |
| Control apples | 80 | 0 |

The percent scald control is calculated in the following manner. Allow $x$ to represent the percent scald on the treated apples, $y$ to represent the percent scald on the control group of apples; then the percent scald control is expressed by the following formula:

$$\text{Percent Scald Control} = \frac{100(y-x)}{y}$$

The foregoing example illustrates the use of diphenylamine and surfactants from Classes 1 and 6 hereinbefore described, together with an organic solvent compatible therewith, in such proportions as to produce a concentrate having a specific gravity greater than 1.000.

EXAMPLE 2

A concentrate was prepared from 40 g. diphenylamine, 15 g. tributyl acetylcitrate, and 45 g. of a mixture of surfactants comprising 80% "Emulphor EL" and 20% "Kessco Glyceryl Mono-Oleate SE."

Ten liters of dilute, aqueous emulsion containing 0.2% diphenylamine was prepared by dispersing 50 g. of said concentrate in water. Upon addition of the concentrate to water, it was noted that the concentrate was more dense than water and sank beneath the surface. After formation of the diphenylamine emulsion, it was also noted that if said emulsion was allowed to stand for a time without agitation or mixing, the dispersed, diphenylamine-rich phase tended to settle downward, rather than rising to the surface, this indicating that its specific gravity was greater than 1.000.

Twenty-five freshly harvested Rome Beauty apples were treated with this emulsion by dipping them therein for a period of one minute and placed in the cold storage at 0° to 1° C. and 90% relative humidity, together with an equal number of apples of the same variety treated in the identical manner with water only. The apples were held in the cold for a period of 150 days, after which they were removed and placed at room temperature of 20° to 23° C. for a period of seven days. The two groups of apples were then rated for the development of storage scald, and the following observations were made:

|  | Percent scald | Percent scald control |
|---|---|---|
| Test apples | 4 | 93.7 |
| Control apples | 64 | 0 |

The foregoing example illustrates the use of diphenylamine and surfactants from Classes 7 and 11 hereinbefore described, together with an organic solvent compatible therewith, in such proportions as to produce a concentrate having a specific gravity greater than 1.000.

EXAMPLE 3

A concentrate was prepared from 50 g. diphenylamine, 20 g. n-propoxypropanol, and 30 g. of a mixture containing 80% of "Emulphor EL-719," 5% of "Span 20," and 15% of "Triton X-114."

Five liters of dilute, aqueous diphenylamine emulsion containing 0.2% diphenylamine was prepared by dispersing 20 g. of said concentrate in water. Upon addition of the concentrate to water, it was noted that the concentrate was more dense than water and that it sank and remained beneath the surface. After formation of the diphenylamine emulsion, it was also noted that if said emulsion was allowed to stand for a time without agitation or mixing, the dispersed, diphenylamine-rich phase tended to settle downward, rather than to rise to the surface, this indicating that its specific gravity was greater than 1.000.

Twenty freshly harvested Cortland apples were drenched with this dispersion by pouring it over them, and then the apples were placed wet in cold storage under the conditions described in Example 1. For comparison, an equal number of apples of the same variety, freshly harvested, were treated in the identical manner with water only and were then placed under the identical storage conditions. The apples were removed after 152 days, held at room temperatures of 20° to 23° C. for seven days, and then were rated for the extent of scald development. The following results were observed:

|  | Percent scald | Percent scald control |
|---|---|---|
| Test apples | 10 | 87.5 |
| Control apples | 80 | 0 |

The foregoing example illustrates the use of diphenylamine and surfactants of Classes 1, 5 and 7 hereinbefore described, together with an organic solvent compatible therewith, in such proportions as to produce a concentrate having a specific gravity greater than 1.000.

EXAMPLE 4

A concentrate was prepared from 15 g. diphenylamine, 20 g. polyethylene glycol 200 diethyl ether, and 65 g. of a mixture of surfactants containing 80% of "Emulphor EL–719," 5% of "Span 20," and 15% of "Triton X–114."

Ten liters of dilute, aqueous emulsion containing 0.15% diphenylamine was prepared by dispersing 100 g. of said concentrate in water. Upon addition of the concentrate to water, it was noted that the concentrate was more dense than water and sank beneath the surface. After formation of the diphenylamine emulsion, it was also noted that if said emulsion was allowed to stand for a time without agitation or mixing, the dispersed, diphenylamine-rich phase tended to settle downward, rather than to rise to the surface, this indicating that its specific gravity was greater than 1.000.

Twenty-five freshly harvested Starking red apples were treated with this emulsion by dipping them therein for a period of approximately 30 seconds, and they were then placed in cold storage at conditions described in the preceding example, together with an equal number of apples of the same variety treated in the identical manner with water only. The apples were removed after 140 days, held at room temperature conditions of 20° to 23° C. for seven days, and then were rated for the extent of scald development. The following results were observed:

|  | Percent scald | Percent scald control |
|---|---|---|
| Test apples | 12 | 83.3 |
| Control apples | 72 | 0 |

The foregoing example illustrates the use of diphenylamine and surfactants of Classes 1, 5 and 7 hereinbefore described, together with an organic solvent compatible therewith, in such proportions as to produce a concentrate having a specific gravity greater than 1.000.

EXAMPLE 5

A concentrate was prepared from 30 g. diphenylamine, 20 g. diethylene glycol diethyl ether, and 50 g. of a mixture containing 8% "Triton X–35" and 92% "Triton X–102."

Five liters of dilute, aqueous emulsion containing 0.21% diphenylamine was prepared by dispersing 35 g. of said concentrate in water. Upon addition of the concentrate to water, it was noted that the concentrate was more dense than water and that it sank and remained beneath the surface as it dispersed. After formation of the emulsion, it was also noted that if said emulsion was allowed to stand for a time without agitation or mixing, the dispersed, diphenylamine-rich phase tended to settle downward, rather than to rise to the surface, this indicating that its specific gravity was greater than 1.000.

Twenty freshly harvested Red Delicious apples were treated with this emulsion by spraying them therewith until they were thoroughly wet, draining for a few moments, and then placing the wet apples in cold storage at conditions described in Example 1, together with an equal number of apples of the same variety, also freshly harvested, which had been sprayed in the identical manner with water only. The apples were removed after 152 days, held at room temperatures as described in the preceding example for seven days, and then were rated for the extent of scald development. The following results were observed:

|  | Percent scald | Percent scald control |
|---|---|---|
| Test apples | 10 | 88.4 |
| Control apples | 85 | 0 |

The foregoing example illustrates the use of diphenylamine and surfactants of Class 1 hereinbefore described, together with an organic solvent compatible therewith, in such proportions as to produce a concentrate having a specific gravity greater than 1.000.

A wide variety of many other organic solvents can be used conjointly with diphenylamine and with surfactants such as those hereinbefore disclosed in the practice of my invention in compositions similar to those immediately preceding and in all manner of variations thereof. Examples of such solvents include, but are not limited to: ethers, such as di-n-butyl ether, di-isobutyl ether, di-n-amyl ether, di-isoamyl ether, di-n-hexyl ether, di-2-ethylhexyl ether, methyl phenyl ether, ethyl phenyl ether; ketones, such as di-n-butyl ketone, decanone-3, acetophenone, propiophenone, isobutyl hexyl ketone, methyl cyclohexanone, isophorone; amino-alcohols, such as isopropanolamine, monoethanolamine, 2-dimethylaminoethanol; heterocyclic compounds, such as morpholine, N-methylmorpholine, N-ethylmorpholine, N - (2 - hydroxyethyl)-morpholine; long chain fatty acids, such as lauric, myristic, palmitic, stearic, oleic, linoleic acids, and hydroxy-acids, such as ricinoleic acid; amides of straight and branched chain fatty acids, such as acetamide, propionamide, dimethylacetamide, dimethyloleamide; and many other organic solvent molecules which function effectively and economically in the preparation of the compositions of the nature and character hereinbefore described and fully explained.

The detailed disclosure of my invention and the description of the practice thereof in the many specific examples of suitable surfactants and of suitable combinations of surfactants with a large variety of organic solvents to produce a wide variety of diphenylamine concentrate solutions and compositions of the nature hereinbefore explained and discussed now enable one skilled in the art to prepare many further modifications and variations conforming to the breadth and spirit of the invention. All such variations and modifications are intended to be comprehended within the scope of the claims.

I claim:

1. A liquid concentrate suitable for dispersion in an aqueous medium, useful for controlling apple storage scald, consisting essentially of from about 5% to about 70% diphenylamine, emulsifier, and from about 1% to about 85% organic solvent selected from the group consisting of esters of aliphatic and alicyclic mono-, di- and tri-hydric alcohols, mono- and di-hydric aliphatic and alicyclic hydroxy compounds containing not less than 4 carbons, morpholine, alkyl morpholines, di-alkyl and alkyl aryl ethers, ketones, amino-alcohols, long chain fatty acids, amides of straight and branched chain fatty acids, said concentrate being an essentially homogeneous solution having a specific gravity greater than 1.000.

2. A concentrate according to claim 1 in which the specific gravity of said composition is from 1.001 to about 1.250.

3. A concentrate according to claim 1 in which the specific gravity of said composition is from 1.01 to 1.06.

4. An aqueous dispersion of the concentrate according to claim 1, containing from about 0.02% to about 0.5% diphenylamine.

5. An aqueous dispersion of the concentrate according to claim 1, containing from about 0.02% to about 0.5% diphenylamine, the disperse phase of said emulsion consisting essentially of a diphenylamine-rich, non-aqueous, internal phase which has a specific gravity greater than that of water.

6. An aqueous dispersion of the concentrate according to claim 3, containing from about 0.02% to about 0.5% diphenylamine, the disperse phase of said emulsion consisting essentially of a diphenylamine-rich, non-aqueous, internal phase which has a specific gravity greater than that of water.

7. Method of controlling apple storage scald which comprises forming an aqueous emulsion of the concentrate of claim 1 said aqueous emulsion containing from about 0.02% to about 0.5% diphenylamine and applying said emulsion to apples.

8. Method of controlling apple storage scald according to claim 7 in which the diphenylamine constitutes the disperse, non-aqueous, internal phase of said emulsion, said disperse phase having a specific gravity greater than that of water.

9. Method of controlling apple storage scald which comprises forming an aqueous emulsion of the concentrate of claim 3 said aqueous emulsion containing from about 0.02% to about 0.5% diphenylamine and applying said emulsion to apples.

10. Method of controlling apple storage scald according to claim 9 in which the diphenylamine constitutes the disperse, non-aqueous, internal phase of said emulsion, said disperse phase having a specific gravity greater than that of water.

References Cited

UNITED STATES PATENTS

| | | | |
|---|---|---|---|
| 3,034,904 | 5/1962 | Kleiman | 99—154 |
| 3,376,142 | 4/1968 | Goonewardene | 99—154 |

MAURICE W. GREENSTEIN, Primary Examiner

J. M. HUNTER, Assistant Examiner

U.S. Cl. X.R.

424—330